United States Patent
Horiyama et al.

(10) Patent No.: US 7,183,519 B2
(45) Date of Patent: Feb. 27, 2007

(54) ELECTRICALLY HEATED SEAT APPARATUS FOR A VEHICLE, VEHICLE INCORPORATING SAME, AND METHOD OF USING SAME

(75) Inventors: Masamichi Horiyama, Saitama (JP); Tsuguhito Ichiriki, Saitama (JP); Naoki Murasawa, Saitama (JP); Koji Suzuki, Saitama (JP); Osamu Nishioka, Saitama (JP); Tomoya Kono, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/172,394

(22) Filed: Jun. 30, 2005

(65) Prior Publication Data

US 2006/0196864 A1    Sep. 7, 2006

(30) Foreign Application Priority Data

Jul. 7, 2004    (JP)    ............................. 2004-200491

(51) Int. Cl.
*H05B 1/00*    (2006.01)
(52) U.S. Cl. ...................................... 219/217; 219/202
(58) Field of Classification Search ................ 219/217, 219/202, 522, 528, 497
See application file for complete search history.

(56) References Cited

U.S. PATENT DOCUMENTS

| 4,700,046 | A |   | 10/1987 | Fristedt |
| 5,873,520 | A | * | 2/1999 | Ratgeber et al. ............. 236/94 |
| 5,948,297 | A |   | 9/1999 | Haubner et al. |
| 6,119,060 | A | * | 9/2000 | Takayama et al. ............ 701/36 |
| 6,124,577 | A | * | 9/2000 | Fristedt ....................... 219/497 |
| 6,237,675 | B1 | * | 5/2001 | Oehring et al. ............... 164/41 |
| 6,252,208 | B1 |   | 6/2001 | Topp |
| 2005/0040682 | A1 | * | 2/2005 | Ulbrich ................. 297/180.12 |

FOREIGN PATENT DOCUMENTS

| DE | 4141062 | 6/1993 |
| DE | 4318432 | 12/1994 |
| DE | 19701958 | 7/1998 |
| DE | 19752135 | 6/1999 |
| DE | 29919346 U | 1/2000 |
| DE | 19844512 | 12/2000 |
| JP | 201-106146 | 4/2001 |

* cited by examiner

*Primary Examiner*—Robin Evans
*Assistant Examiner*—Vinod Patel
(74) *Attorney, Agent, or Firm*—Carrier, Blackman & Associates, P.C.; William D. Blackman; Joseph P. Carrier (57) ABSTRACT

A seat heating element and electronic temperature selector is provided for use in a motorcycle or other saddle-type vehicle, driven by an engine as a source of power. A vehicle seat is provided with first and second heating elements, and the temperature selector controls a supply of electric power to the heating elements, to warm up the vehicle seat. The control unit includes first and second electric relays for use in temporarily blocking power from the electric power source to the heating element, for a predetermined interval, upon detection of an accelerated state of the vehicle. The heating element and control system thereof improves acceleration performance of the vehicle, even when using an electric seat heating element, by temporarily interrupting electric power flow to the seat heating element during acceleration.

15 Claims, 9 Drawing Sheets

ELECTRICALLY HEATED SEAT APPARATUS FOR A VEHICLE, VEHICLE INCORPORATING SAME, AND METHOD OF USING SAME

CROSS-REFERENCE TO RELATED APPLICATIONS

The present invention claims priority under 35 USC 119 based on Japanese patent application No. 2004-200491, filed on Jul. 7, 2004. The subject matter of this priority document is incorporated by reference herein.

BACKGROUND OF THE INVENTION

1. Field of the Invention

The present invention relates to a heated vehicle seat with an internal heating apparatus, configured to warm up a surface of the seat by supplying electric power to a heating element provided therein. The invention also relates to a vehicle incorporating the heated seat apparatus, and to a method of using the apparatus.

2. Description of the Background Art

A number of different devices are known for electrically heating vehicle seats. Some examples of electric heating devices for vehicle seats have previously been known, including an electric heating element provided in a vehicle seat.

It is also known to interpose a thermostat between a heating element of a vehicle seat and an electric power source, thereby permitting intermittent supply of the electric power to the heating element, as needed to maintain a heat setting.

A cover for a vehicle seat, provided with a heating element, has become known as an electric heating device for a vehicle seat (see Japanese Unexamined Patent Publication No. 2001-106146 (P. 4, FIG. 1), for example).

One example of a conventional electric heating device for a vehicle seat includes: a cover which covers a vehicle seat; a heating element for heating this cover; a thermostat for turning electric power supplied to this heating element on and off; a selector for setting a target temperature for the heating element; and a battery for supplying electric power to the heating element.

In the conventional electric seat-heating device for a vehicle, the target temperature of the heating element is chosen with the selector. Electricity is supplied from the battery to the heating element, and the supply of electricity is turned on and off by the thermostat. Meanwhile, the known heated seats could use improvement, because the warm-up time between starting and achieving the target temperature takes too long, for example, when an outside temperature is low, and if this warm-up time could be shortened, comfort of the seat could be further improved.

It is notable that electrical resistance heating requires a significant amount of electric power to operate, which could make this power temporarily unavailable for other uses. Moreover, in conventional electric heating devices for vehicle seats, control of electricity for the heating function in response to a load condition of a vehicle has been sought after, instead of electric supply control in response to a drive condition of the vehicle. That is to say, with the known heated seats, electricity is supplied to the heating element even during acceleration of a vehicle (a motorcycle, for example). Depending on a driving condition, there may be a case where it is desired to improve an acceleration performance by temporarily interrupting or reducing a load attributable to electric power generation, for example.

Accordingly, a need still exists for an improved vehicle seat having an electric heating apparatus integrated therein, which can be modulated to improve the acceleration performance even during operation of the electric heating apparatus. A need also exists for an improved heated vehicle seat apparatus, which can be operated to improve comfort by quickly achieving a target temperature during a warm-up period.

SUMMARY OF THE INVENTION

The present invention provides an electrically heated seat apparatus for a vehicle.

It is an object of the present invention to provide an improved heated vehicle seat apparatus, and method of operation thereof, that is capable of improving vehicle acceleration performance, by temporarily interrupting the supply of electric power to the heating element during acceleration of the vehicle. It is another object of the present invention to provide a heated seat apparatus which is operable to reduce the time required to achieve a target temperature during warm-up.

According to a first aspect of the invention, a vehicle seat is provided with a heating element, and a control unit for the seat is operable to supply an electric current to this heating element at a normal operating level.

The control unit is further configured to supply a boosted level of electric current to the heating element, which is larger than the normal operating level, for a predetermined warm-up period after initiating electric power supply to the seat. The control unit is also configured to restore the electric current back to the normal operating level after passage of the predetermined warm-up period.

Therefore, it is possible to quickly warm up the vehicle seat. This is advantageous since it improves the comfort of the vehicle seat under cold conditions. For example, when starting, it is preferable to allow the vehicle seat to achieve a target temperature as soon as possible, using the heated vehicle seat apparatus hereof, as comfort can thereby be improved.

Accordingly, the vehicle seat is quickly warmed up by use of the control unit provided. The control unit is configured to supply a boosted level of electric current, larger than the normal operating level, from the electric power source to the heating element for the predetermined warm-up period, and then to restore the electric current back to the normal operating level, after passage of the predetermined warm-up period.

A second aspect of the invention is characterized in that the vehicle seat is a composite seat, including a front seat for supporting a driver thereon, and a rear seat for supporting a passenger. The heating element includes first and second heating element segments for respectively warming up the front and rear seats, and further includes first and second temperature selectors corresponding to the first and second heating elements, respectively. The first and second temperature selectors are capable of respectively and independently setting temperatures of these first and second heating elements.

Accordingly, the temperatures of the vehicle seat can be changed in response to the preferences of the driver and the passenger. This is advantageous since it is possible to improve the comfort of the passengers using the heated vehicle seat apparatus according to an embodiment of the invention.

Moreover, it is possible to warm up only a necessary part of the seat. Accordingly, it is possible to use the electricity efficiently, contributing to reduction in power consumption.

A third aspect of the invention is characterized in that, in one illustrative arrangement of components, the first temperature selector is disposed on an instrument panel in front of the front seat, and the second temperature selector is disposed on a glove compartment beside the rear seat.

In this illustrative arrangement, the first temperature selector is disposed on the instrument panel, in front of the front seat, so as to allow the driver to easily change the target temperature for the front seat immediately upon feeling discomfort. Similarly, in this illustrative arrangement, the second temperature selector is disposed in the glove compartment beside the rear seat to allow the passenger to freely and easily change the target temperature of the rear seat upon feeling discomfort, without disturbing the driver.

In a fourth aspect of the invention, a vehicle is configured to be driven by an engine as a source of power, to include an excitation-type alternating-current generator and to include a vehicle seat with an integral heating element. The vehicle includes an electric power source as a power supply for this heating element, and the vehicle seat is warmed up by controlling the heating element with a control unit.

The control unit includes a mechanism to temporarily interrupt the supply of electric power to the seat, only for a predetermined interval, upon detection of an accelerated state of the vehicle. As a result, there is the advantage of improved acceleration of the vehicle.

For example, when the vehicle includes an excitation-type alternating-current generator, it is possible to suspend electric power generation by stopping the electric supply to a field coil in the generator when the load on a battery is low. Therefore, it is possible to reduce a load on the engine by temporarily suspending the electric power generation. It is preferable to reduce an output loss, attributable to electric power generation during acceleration, and improve an acceleration performance.

Accordingly, by providing the control unit with the electric power source interruption function for temporarily blocking the flow of electricity to the seat heating element, the electric power source is able to be blocked only for the predetermined interval, during acceleration of the vehicle. By blocking the electric power source, it is possible to temporarily reduce the load of electric power generation, and to improve the acceleration performance.

A fifth aspect of the invention is characterized in that the predetermined interval is equal to an interval beginning when the electric power source is blocked by the electric power source interruption function of the control unit, and ending after a predetermined number of rotations of the engine crankshaft.

According to the fifth aspect of the invention, it is possible to set the predetermined interval longer when the rotary engine speed is low, and to set the predetermined interval shorter when the rotary engine speed is high. This aspect of the invention, therefore, permits setting of the interval for blocking the electric power source to reflect a driving condition (the accelerated state), by making the blocking interval correspond to the rotary engine speed.

A sixth aspect of the invention is characterized in that the accelerated state is defined as a point when there is a throttle position change, exceeding a predetermined angle, in a throttle valve within a predetermined time period.

Accordingly, it is possible to accurately detect the accelerated state, either where accelerating from a low vehicle speed, or where accelerating from a higher vehicle speed. That is to say, there is an advantage, by defining the accelerated state in this way, as it is possible to detect the accelerated state, irrespective of the current vehicle speed, by detecting the angular change in throttle position.

According to a seventh aspect of the invention, the control unit includes a counter, for counting rotations of the crankshaft from the beginning when an accelerated state is again detected in the course of blocking the electric power source.

Accordingly, it is possible to block the electric power source again when acceleration is restarted at a highway entrance, for example. As a result, there is an advantage that it is possible to further improve the acceleration performance of the vehicle.

An eighth aspect of the invention is characterized in that the control unit includes a mechanism for restarting the supply of electric power to the heating element, when it is detected that the vehicle is no longer accelerating.

Accordingly, it is possible to quickly warm up the vehicle seat, under conditions where rapid acceleration is not needed. As a result, there is an advantage that it is possible to further improve comfort of the vehicle seat.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

A selected illustrative embodiment of the invention, including the best mode currently contemplated for carrying out the present invention, will be described below with reference to the accompanying drawings. Here, the drawings are to be viewed from directions of reference numerals.

Figure 1:
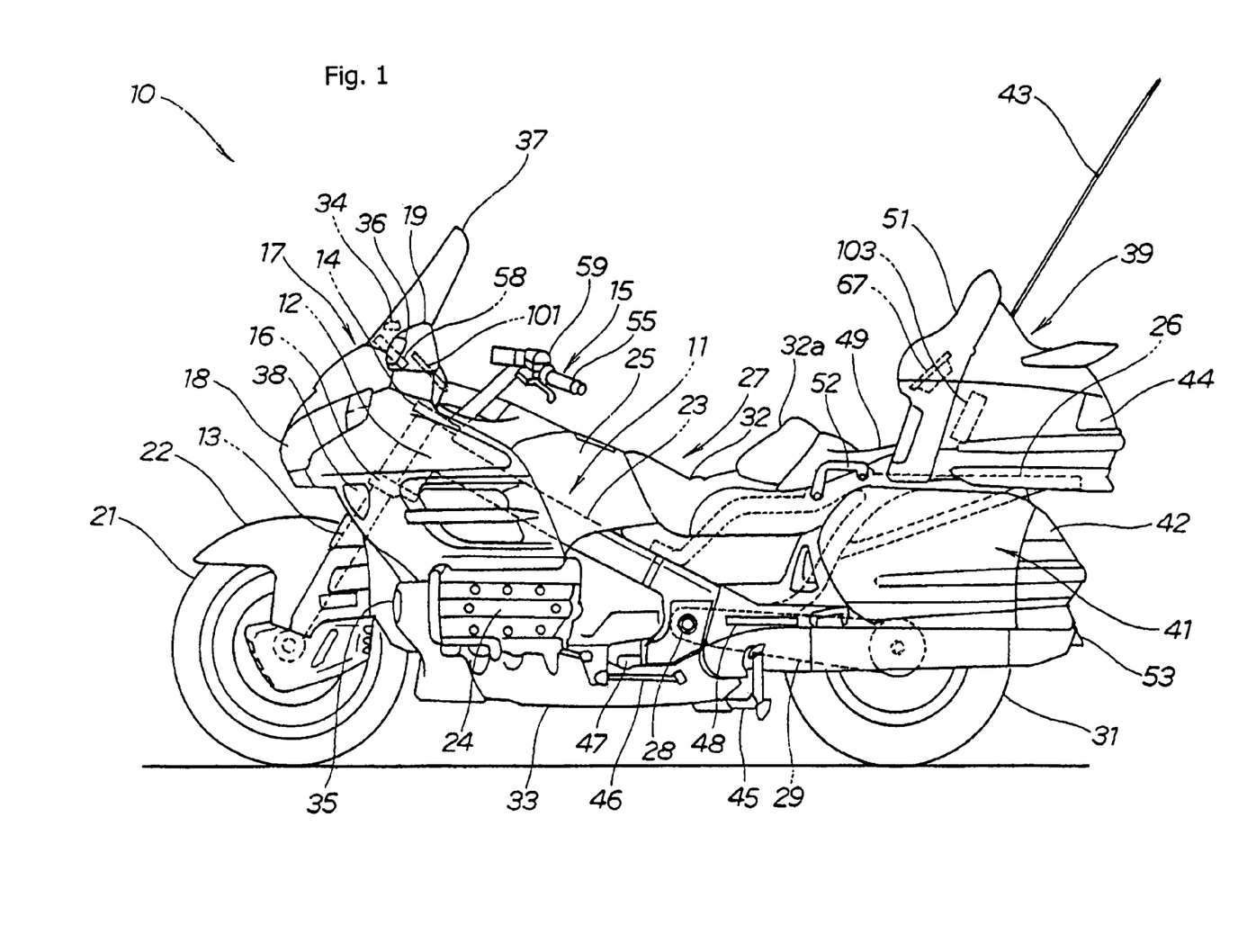
FIG. 1 is a side elevational view of a motorcycle adopting a heated vehicle seat apparatus according to an illustrative embodiment of the present invention.

As seen in FIG. 1, a motorcycle 10 is presented as a vehicle with a heated seat which includes an electric heating apparatus according to the illustrative embodiment of the present invention. The motorcycle 10 includes a head pipe 12 fitted to a vehicle body frame (a vehicle body) 11, a front fork 13 fitted to the head pipe 12 in a manner so as to be capable of pivotally steering a front wheel 21. A steering handlebar 15 is fitted to a top bridge 14 of this front fork 13, and a fairing 17 is provided in front of the top bridge 14 and a bottom bridge 16. Further, the motorcycle 10 includes dual head lights 18 (one headlight 18 is not shown) disposed on a front face of this fairing 17, and right and left mirrors 19 (one is not shown) disposed thereon. The front wheel 21 is rotatably fitted to a lower part of the front fork 13, and a front fender 22 is provided for covering an upper portion of the front wheel 21.

The motorcycle 10 is also equipped with a main frame 23 of the vehicle body frame 11, which extends backward from the head pipe 12. Disposed below this main frame 23 is an engine 24 and below the main frame 23 is a fuel tank 25. A seat rail 26 extends backward from the main frame 23, and a vehicle seat 27 fits on this seat rail 26.

Extending from a lower back part of the main frame 23 through a pivot 28, is a rear swing arm 29. A rear wheel 31 fits rotatably to a rear end of this rear swing arm 29, and a rear shock absorber (not shown) extends between a rear part of the rear swing arm 29 and the vehicle body frame 11.

Above the rear wheel 31 is a saddle bag 41 and behind this saddle bag is the rear turn signal indicator lamp 42. Above the rear turn signal indicator lamp is a tail light 44 and resting further above is a rod antenna 43 and a trunk box 39.

Below the engine 24 sits an under cover 33 and to the rear of the engine 24 sits a driver footrest 47, and sub stand 46, a passenger footrest 48 and a main stand 45. Sitting in front of the engine 24 is a fog light 35 and above this on the fairing 17 is an air intake 38 for supplying air to the engine 24. Extending above the fairing 17 is a wind screen 37, behind which is a GPS antenna (global positioning system antenna) 34 and a front turn signal indicator lamp 36.

Here, the vehicle seat 27 is a compound seat, including a front seat (a driver's seat) 32 for supporting a driver, and a rear seat (a passenger seat) 49, for supporting a passenger thereon. The front seat 32 includes a hip rest unit 32a for supporting a hip or lower back portion of the driver, while the rear seat 49 includes a backrest unit 51 for allowing the passenger to lean on and grab hand rails 52 and 52 (52 located behind is not shown), onto which the passenger holds.

Figure 2:
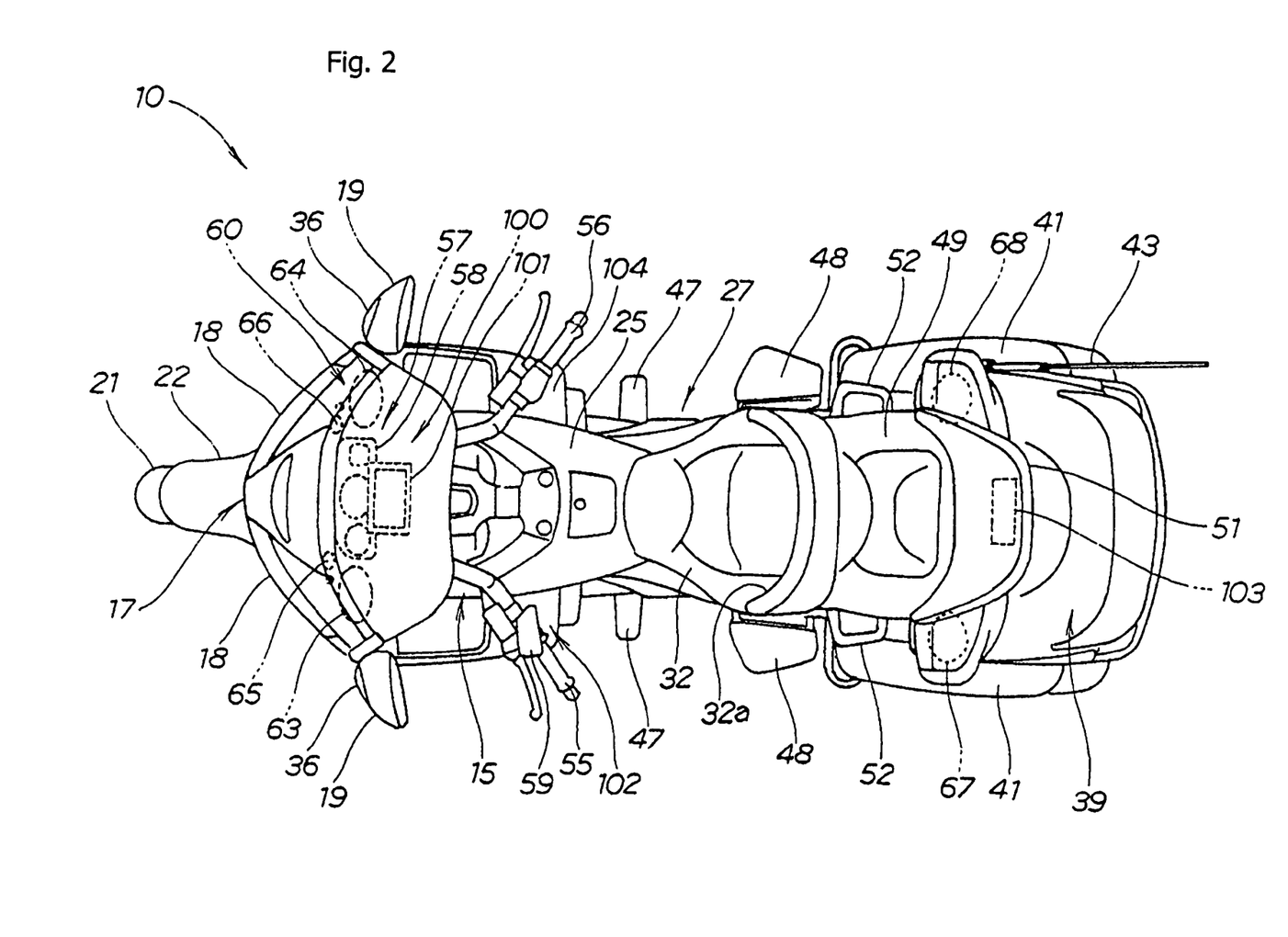
FIG. 2 is a top plan view of the motorcycle of FIG. 1, adopting the heated vehicle seat apparatus according to the illustrative embodiment of the present invention.

An acoustic system 60, as shown in FIG. 2, annexed to the motorcycle 10 includes: left and right midrange and bass units 63 and 64 for playing midrange and bass sounds which are disposed on the left and right of a meter indicator unit (a vehicle meter) 58; a left treble unit 65 for playing treble sounds which is disposed between the meter indicator unit 58 and the left midrange and bass unit 63; a right treble unit 66 for playing treble sounds which is disposed between the meter indicator unit 58 and the right midrange and bass unit 64; left and right deep bass units (deep bass speakers) 67 and 68 capable of playing a lower frequency range than the left and right midrange and bass units 63 and 64, which are annexed to an inside of the trunk box 39; and a component 69 (not shown) for generating reproduced sounds for these units 63 to 68.

Here, the component 69 means an audio instrument including functions of a tuner, a CD (compact disc) deck, a MD (mini disc) deck, a cassette deck, an amplifier, and the like.

A navigation system 100 annexed to the motorcycle 10 is a system in which a navigation display unit 101 is disposed behind the meter indicator unit 58. An operating unit 102 is formed in a separated manner and disposed around the steering handlebar 15 and a cowl (an upper panel) 104, and a control unit 103 is housed in the trunk box 39. Meanwhile, the left and right handle grips 55 and 56 respectively, are disposed on opposite ends of the steering handlebar 15, and a handle switch box 59, containing switches to be operated while driving, is disposed on the left of the steering handlebar 15.

Figure 3:
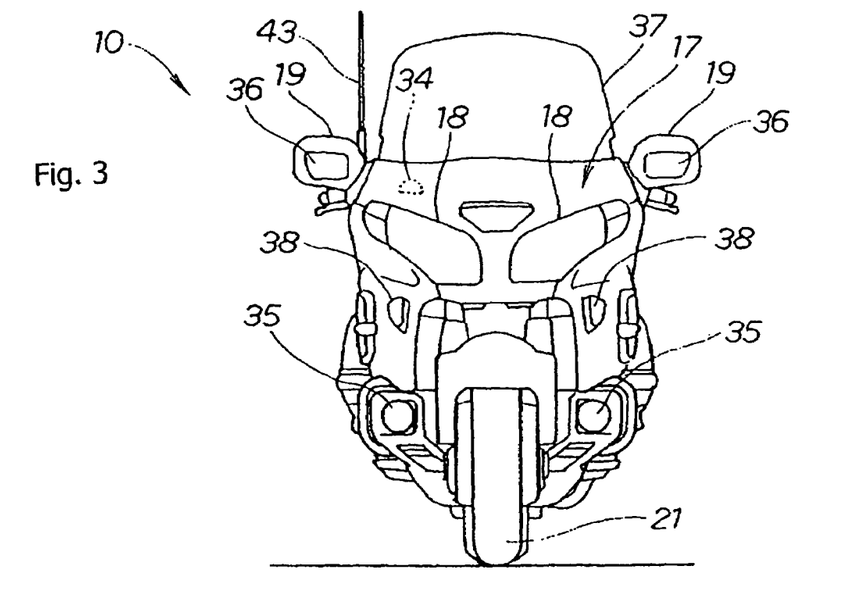
FIG. 3 is a front plan view of the motorcycle of FIGS. 1–2, adopting the heated vehicle seat apparatus according to the illustrative embodiment of the present invention.

The GPS antenna 34 is disposed in front of the vehicle body, as shown in FIG. 3, and the left and right fog lamps 35 are disposed below the vehicle body. The headlights 18 are disposed at the fairing 17 as are the left and right mirrors 19. The left and right front turn signal indicator lamps 36 are integrally incorporated into these mirrors 19, and the left and right air intakes 38 are provided on the fairing 17.

Note that the GPS antenna 34 is preferably one which can be incorporated into an instrument panel (a meter panel) 57 or the fairing 17, such as a chip antenna, a batch antenna, or a helical antenna.

Figure 4:
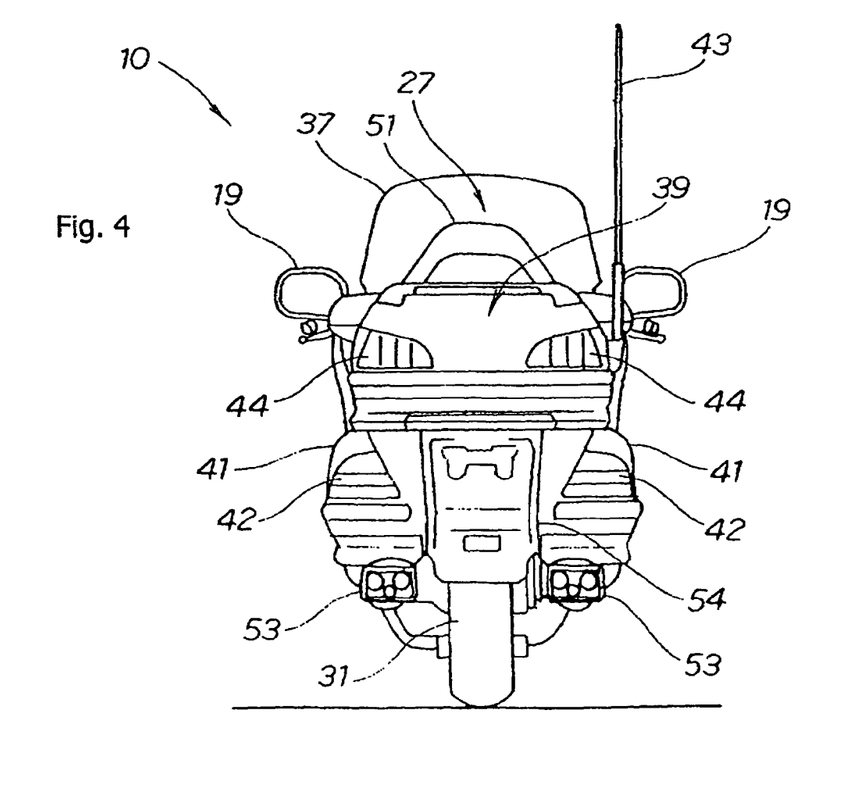
FIG. 4 is a rear plan view of the motorcycle of FIGS. 1–3, adopting the heated vehicle seat apparatus according to the illustrative embodiment of the present invention.

FIG. 4 shows the trunk box 39 in the center of a rear part of the vehicle body and the left and right saddle bags 41 on both sides of this trunk box 39. Behind these saddle bags 41 are the left and right rear turn signal indicator lamps 42. FIG. 4 also shows that the rod antenna 43 is disposed on the right of the trunk box 39, left and right tail lamps 44 are disposed on a back of the trunk box 39, the left and right mufflers 53 are disposed below the vehicle body, and the rear wheel 31 is covered with a rear fender 54.

Figure 5:
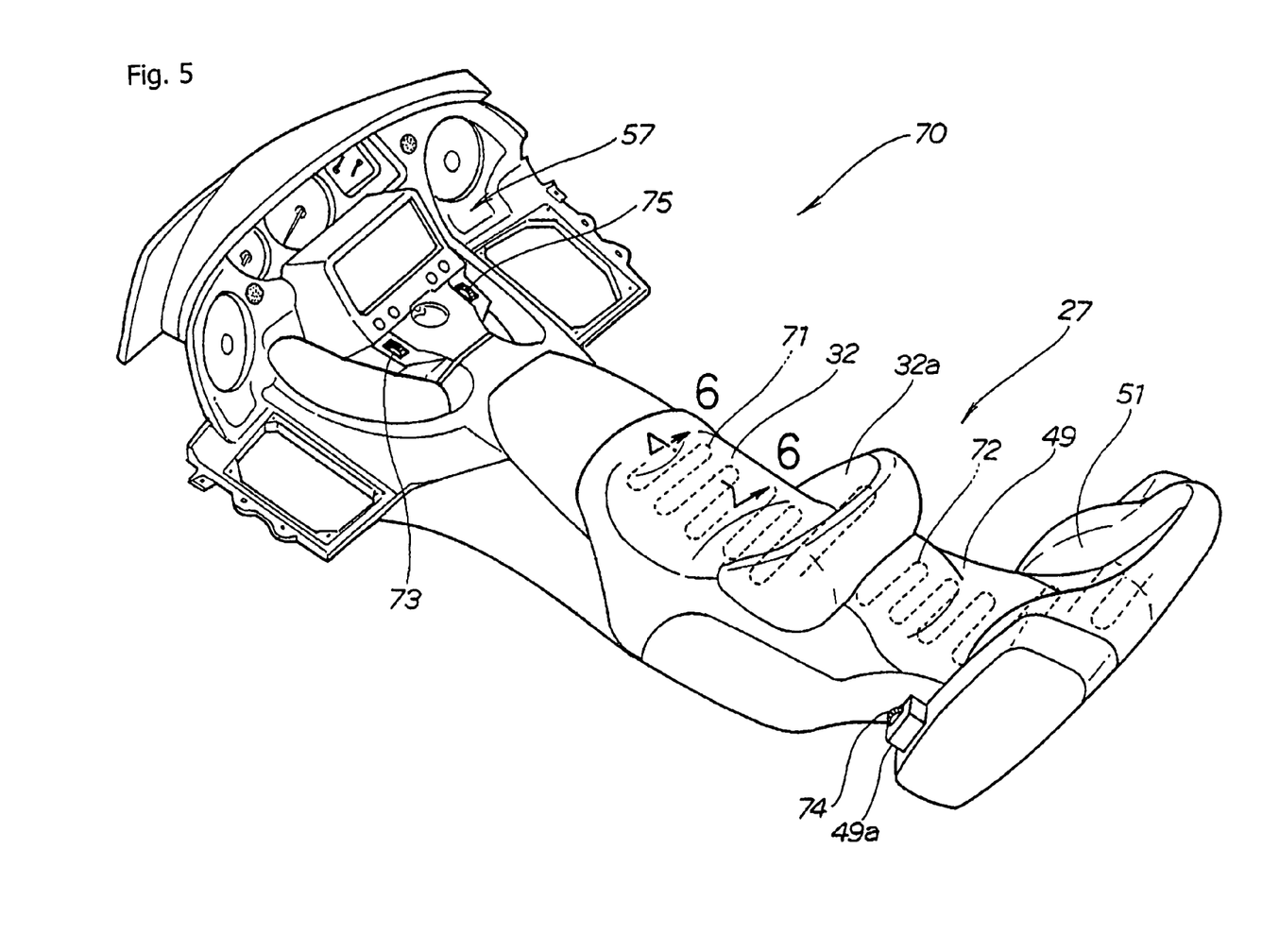
FIG. 5 is a perspective detail view of the heated vehicle seat apparatus according to the illustrative embodiment of the present invention, with a heating element shown in phantom, below the seat cover.

In the depicted embodiment of the invention, an electric heating apparatus 70 for a vehicle seat is capable of separately setting different seat temperatures for the front seat 32 and for the rear seat 49. The front seat 32 is provided with a first heating element 71, and the instrument panel 57 is provided with a first temperature selector 73 for setting a temperature of this first heating element 71. Similarly, the rear seat 49 is provided with a second heating element 72, and a second temperature selector 74 is provided on a glove compartment 49a beside the rear seat 49, for setting a temperature of this second heating element 72, independent of the first heating element setting.

Furthermore, there is a handle grip temperature setting unit 75, also situated on the instrument panel, which can target temperatures of the left and right handle grips.

The first heating element 71 can also warm up the hip rest unit 32a by being annexed to the hip rest unit 32a of the front seat 32, while the second heating element 72 can also warm up the backrest unit 51 by being annexed to the backrest unit 51 of the rear seat 49. Moreover, the first and second heating elements operate independently of one another, and each heating element 71, 72 is capable of being set at a temperature independent of the other heating element by means of its respective associated temperature selector.

By independently providing the first and second heating elements 71 and 72 for respectively warming up the front and rear seats, and providing these heating elements with the respective temperature selectors 73, 74 which can set the temperatures independently, it is possible to change the temperatures of the vehicle seat 27 in accordance with the preference of the driver or the passenger. Moreover, it is possible to warm up only a necessary part of the seat. Accordingly, this uses electricity efficiently, and helps reduce power consumption.

Meanwhile, the electric heating apparatus 70 is configured to include the first temperature selector 73 disposed at the instrument panel 57 in front of the front seat 32, and the second temperature selector 74 disposed on the glove compartment 49*a* beside the rear seat 49.

By disposing the first temperature selector 73 at the instrument panel 57 in front of the front seat 32 and disposing the second temperature selector 74 on the glove compartment 49*a* beside the rear seat 49, the passenger can freely and independently change a target temperature of the rear seat 49 as desired, without disturbing the driver. As a result, the convenience of the electric heating apparatus 70 is improved.

Figure 6:
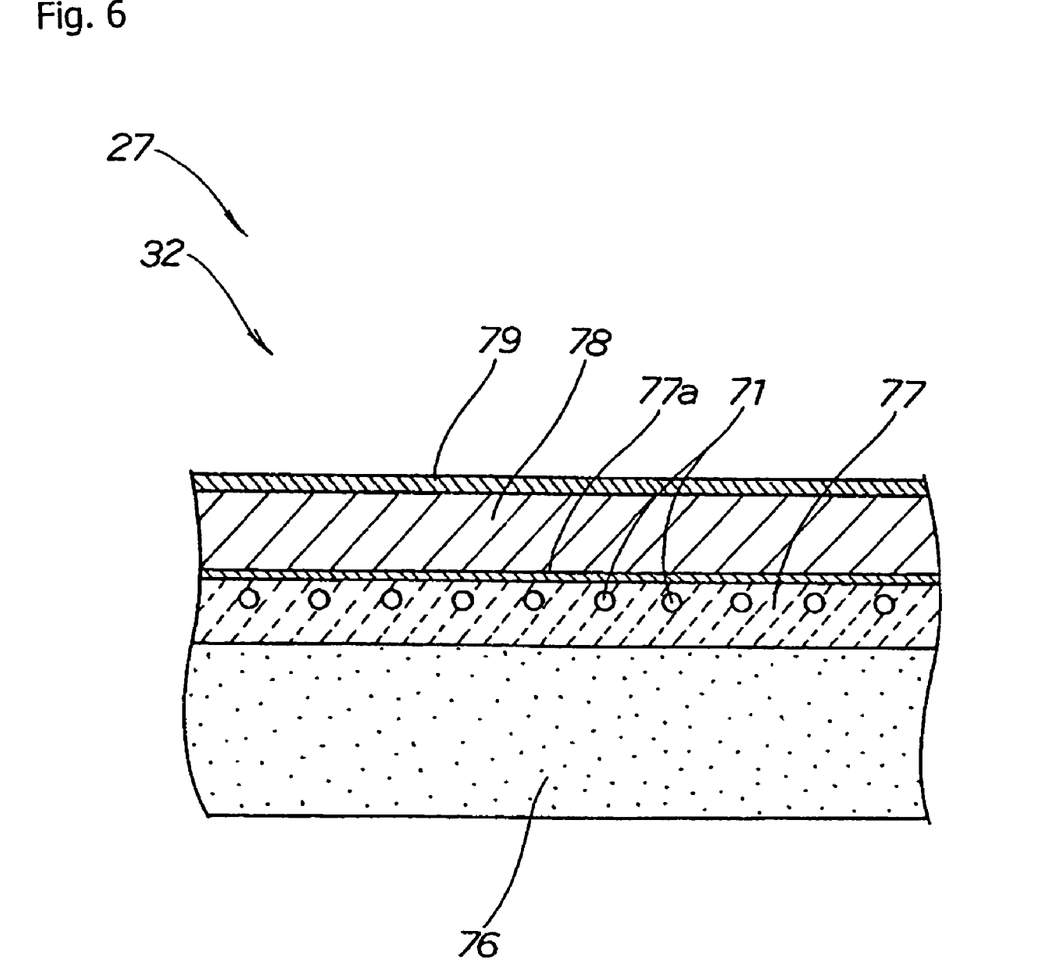
FIG. 6 is a cross-sectional detail view of a portion of the heated seat, taken along line 6—6 of FIG. 5.

The front seat (the driver's seat) 32 includes a base cushion unit 76, as shown in FIG. 6. This base cushion unit 76 provides cushioning and may be formed of urethane foam. Above this base cushion unit 76 there is a heating element layer 77, which permits the first heating element 71 to be inserted above the base cushion unit 76, followed by a wadding (fitting cotton) layer 78 provided above this heating element layer 77 via a sheet material 77*a*. A skin 79 covers the base cushion unit 76, the heating element layer 77, and the wadding layer 78. Note that the rear seat (the passenger seat) 49 has the same configuration as the front seat 39, and therefore, redundant explanation thereof will be omitted.

Figure 7:
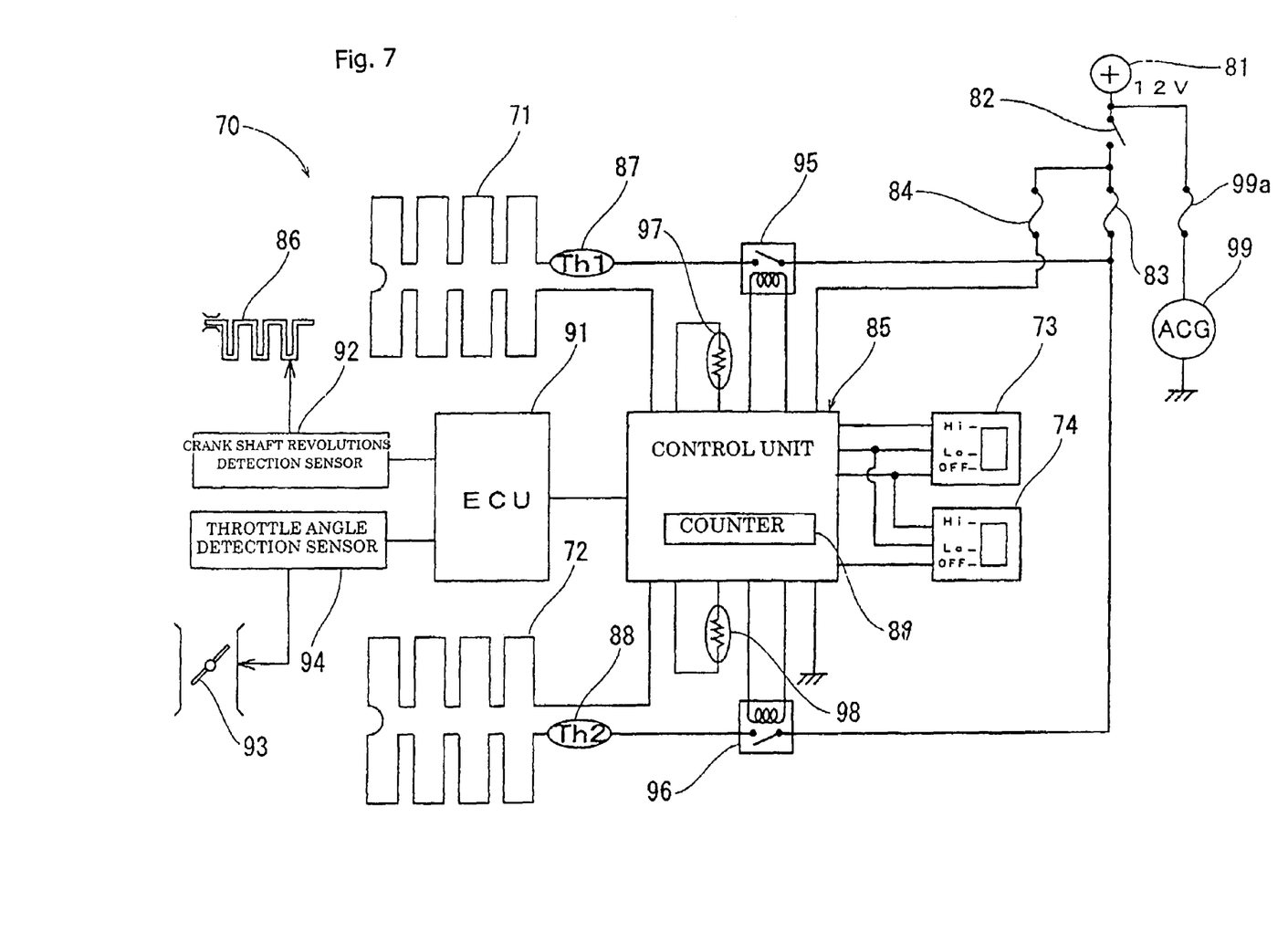
FIG. 7 is a simplified schematic diagram of the heated vehicle seat apparatus according to the illustrative embodiment of the present invention.

Referring to FIG. 7, the electric heating apparatus 70 is configured to supply electricity from a battery 81 as an electric power source to the first and second heating elements 71 and 72. This power is supplied to the electric heating apparatus 70 through an ignition switch (an engine switch) 82, and through an electric power source circuit fuse 83, which supplies electricity from the battery 81 to a control unit 85 through the ignition switch 82 and through a signal circuit fuse 84. Consequently, this control unit 85 controls the first and second heating elements 71 and 72.

The first heating element 71 includes a first thermostat 87 for turning off the electric power when the front seat 32 achieves a (first) target temperature. The second heating element 72 includes a second thermostat 88 for turning off the electric power when the rear seat 49 achieves a (second) target temperature.

The control unit 85 includes a counter 89 for counting the rotation of a crankshaft 86, a crankshaft revolutions sensor 92 for detecting revolutions of the crankshaft 86 through an electronic control unit (ECU) 91 (see FIG. 1), and a throttle angle sensor 94 for detecting a throttle position of a throttle valve 93 through the ECU 91.

The crankshaft revolutions sensor 92 is a magnetic sensor. The crankshaft revolutions sensor 92 allows the control unit 85 to recognize the rotation of the crankshaft 86 and compare a counted number of revolutions to a predetermined number of revolutions. The throttle angle sensor 94 allows the control unit 85 to determine presence of an accelerated state when there is a change in the position of the throttle valve 93, exceeding a predetermined angle, within a predetermined time period.

The control unit 85 also includes first and second power interruption relays 95 and 96 as a mechanism for regulates power supply from the electric power source to the heating elements 71, 72 by alternately connecting or disconnecting respective internal switches therein. The first and second power interruption relays 95 and 96 are relays for blocking or applying the electric power source to the first and second heating elements 71 and 72.

The control unit 85 also includes a first thermistor 97 for correcting the temperature of the front seat 32, a second thermistor 98 for correcting the temperature of the rear seat 49, the first temperature selector 73 for setting the temperature of the front seat 32, and the second temperature selector 74 for setting the temperature of the rear seat 49.

The first and second thermistors 97 and 98 are components for sensing an outside temperature and correcting the temperatures of the front and rear seats 32 and 49 along with the outside temperature. The first and second temperature selectors 73 and 74 are temperature setting members which can steplessly change from blocking (OFF) to a low temperature (Lo) and from the low temperature (Lo) to a high temperature (Hi).

Meanwhile, an excitation-type alternating-current generator (ACG) 99 is configured to stop electric supply to a field coil (not shown) of the excitation-type alternating-current generator 99 when a load on the battery 81 is low, and thereby not generate electric power. This excitation-type alternating-current generator 99 is followed by an excitation-type alternating-current generator fuse 99*a*.

The electric heating apparatus 70 is a part of the vehicle (the motorcycle) 10 driven by use of the engine 24 as a source of power and configured to include the excitation-type alternating-current generator 99. The electric heating apparatus also provides the vehicle seat 27 with the heating elements (the first and second heating elements) 71 and 72 and supplies the electric power source to the heating elements 71 and 72, warming up the vehicle seat 27 by controlling the heating elements 71 and 72 with the control unit 85. This control unit 85 includes the first and second electric power source relays (the electric power source blocking mechanism) 95 and 96, for blocking the electric power source only for a predetermined interval upon detection of an accelerated state of the vehicle 10.

For example, in terms of the vehicle including the excitation-type alternating-current generator, it is possible to stop electric supply to the field coil of the excitation-type alternating-current generator when the load on the battery is low and thereby not generate electric power. Furthermore, stopping electric power generation reduces a load on the source of power such as the engine. It is preferable to reduce an output loss attributable to electric power generation during acceleration because it improves acceleration.

Figure 8:
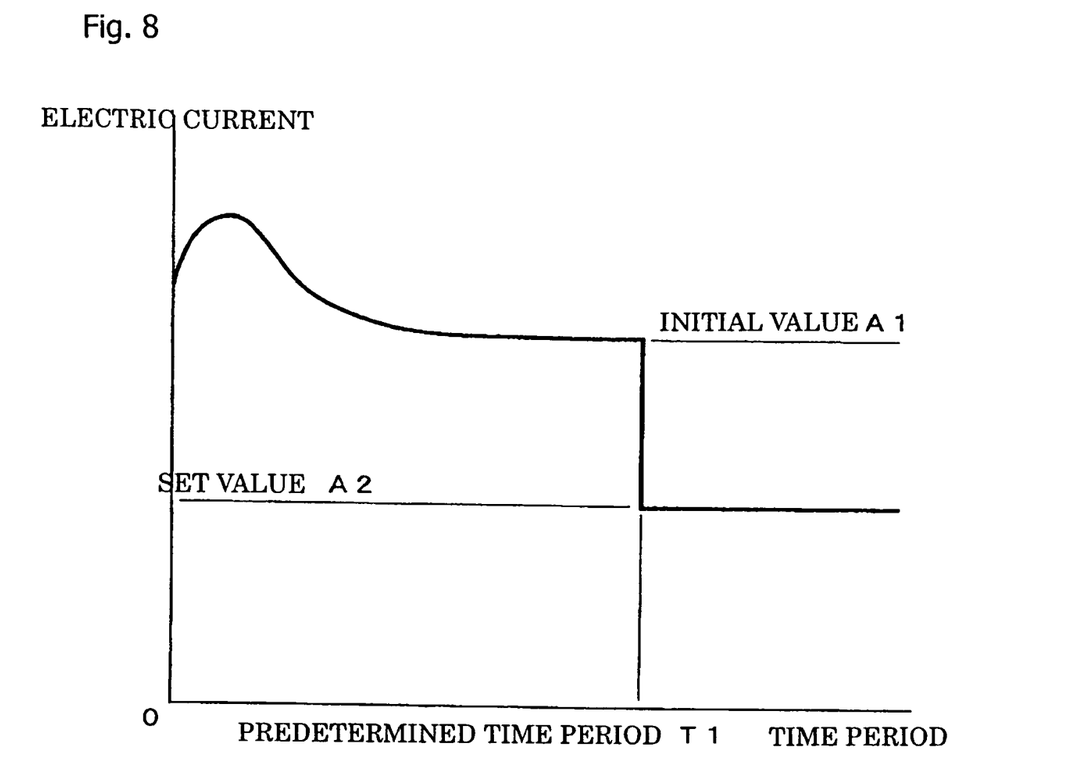
FIG. 8 is a graph illustrating electric current control by a control unit, immediately after applying an electric power source of the heated vehicle seat apparatus according to the illustrative embodiment of the present invention.

FIG. 8 is a graph illustrating electric current control by the control unit 85 immediately after applying the electric power source of the electric heating apparatus 70 for a vehicle seat according to the present invention. FIG. 8 shows electric current control when starting the electric supply to the first heating element 71 by turning on the ignition switch 82 and turning on the first electric power source relay 95. Note that the lateral axis indicates the time period and the longitudinal axis indicates the electric current.

Here, assuming that the electric current to be supplied to the first heating element 71 immediately after applying the electric power source is an initial value A1. Also assume that a time period for maintaining the initial value A1 is a predetermined time period T1 and that the electric current to be supplied after passage of the predetermined time period T1 (the electric current in a constant state) is a normal operating level A2. The control unit 85 performs control to both maintain the initial value A1>the normal operating level A2 for the predetermined time period T1 and to restore the normal operating level A2 after passage of the predetermined time period T1. Note that the second heating element is controlled in a manner similar to the first heating element.

Again, the electric heating apparatus 70 provides the vehicle seat 27 (see FIG. 1) with the first and second heating elements (the heating elements) 71 and 72, and supplies the electric power source to the first and second heating elements 71 and 72, which includes the control unit 85 for supplying the electric current larger than the normal operating level to the first and second heating elements 71 and 72 for the predetermined time period after applying the electric power source and for restoring the electric current back to the normal operating level after passage of the predetermined time period.

For example, if the vehicle seat can achieve the target temperature as soon as possible when starting to use the heated vehicle seat apparatus, it is possible to improve comfort and is therefore preferable. Therefore, it is possible to warm up the vehicle seat quickly by providing the control unit 85 for supplying the electric current larger than the normal operating level to the first and second heating elements 71 and 72 for the predetermined time period after applying the electric power source and for restoring the electric current back to the normal operating level after passage of the predetermined time period. As a result, it is possible to improve comfort of the vehicle seat.

Figure 9A:
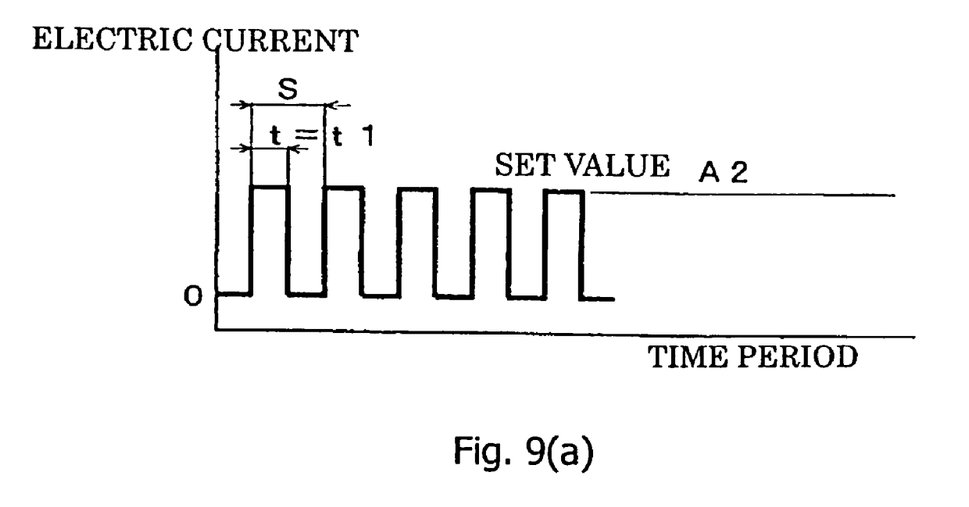
FIG. 9(a) is a graph showing electric current control by the control unit in a stabilized state of the heated vehicle seat apparatus according to the illustrative embodiment of the present invention, in which the controller is set to "low" and the electric supply time period t is t1 within the electric supply cycle S.
Figure 9B:
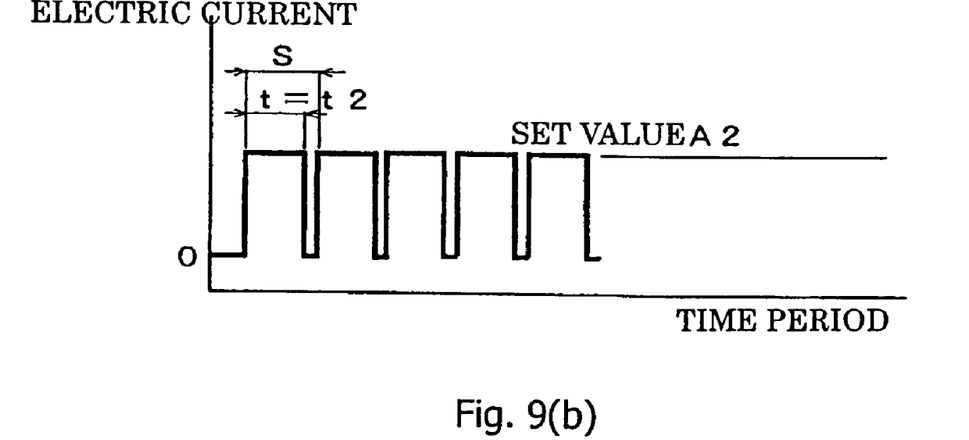
FIG. 9(b) is a graph showing electric current control by the control unit in a stabilized state of the heated vehicle seat apparatus according to the illustrative embodiment of the present invention, in which the controller is set to "high" and the electric supply time period t is t2 within the electric supply cycle S, wherein t2>t1.

FIGS. 9(a) and 9(b) are graphs showing electric current control by the control unit 85 in the constant state of the electric heating apparatus 70. Note that the lateral axes indicate the time period and the longitudinal axes indicate the electric current.

FIG. 9(a) shows electric current control of the first heating element 71 when setting the first temperature selector 73 to a low temperature (a Lo state) in the constant state (at the normal operating level A2).

Assuming that an electric supply cycle is S (constant) and that an electric supply time period in the electric supply cycle S is t, the control unit 85 is configured to perform control by shortening the electric supply time period t (achieving t=t1) when setting the first temperature selector 73 to the low temperature (the Lo state).

Note that electric current control of the second heating element 72 when setting the second temperature selector 74 to the low temperature (the Lo state) is also the same.

FIG. 9(b) shows electric current control when setting the first temperature selector 73 to a high temperature (a Hi state).

The control unit 85 is configured to perform control by lengthening the electric supply time period t in the electric supply cycle S (achieving t=t2) when setting the first temperature selector 73 to the high temperature (the Hi state).

Note that electric current control of the second heating element 72 when setting the second temperature selector 74 to the high temperature (the Hi state) is also the same.

That is to say, comparing the electric supply time period t1 shown in FIG. 9(a) with the electric supply time period t2 shown in FIG. 9(b), t2>t1 holds true. The control unit 85 is configured to perform adjustment to a desired temperature by changing the electric supply time period t in the electric supply cycle S.

Figure 10:
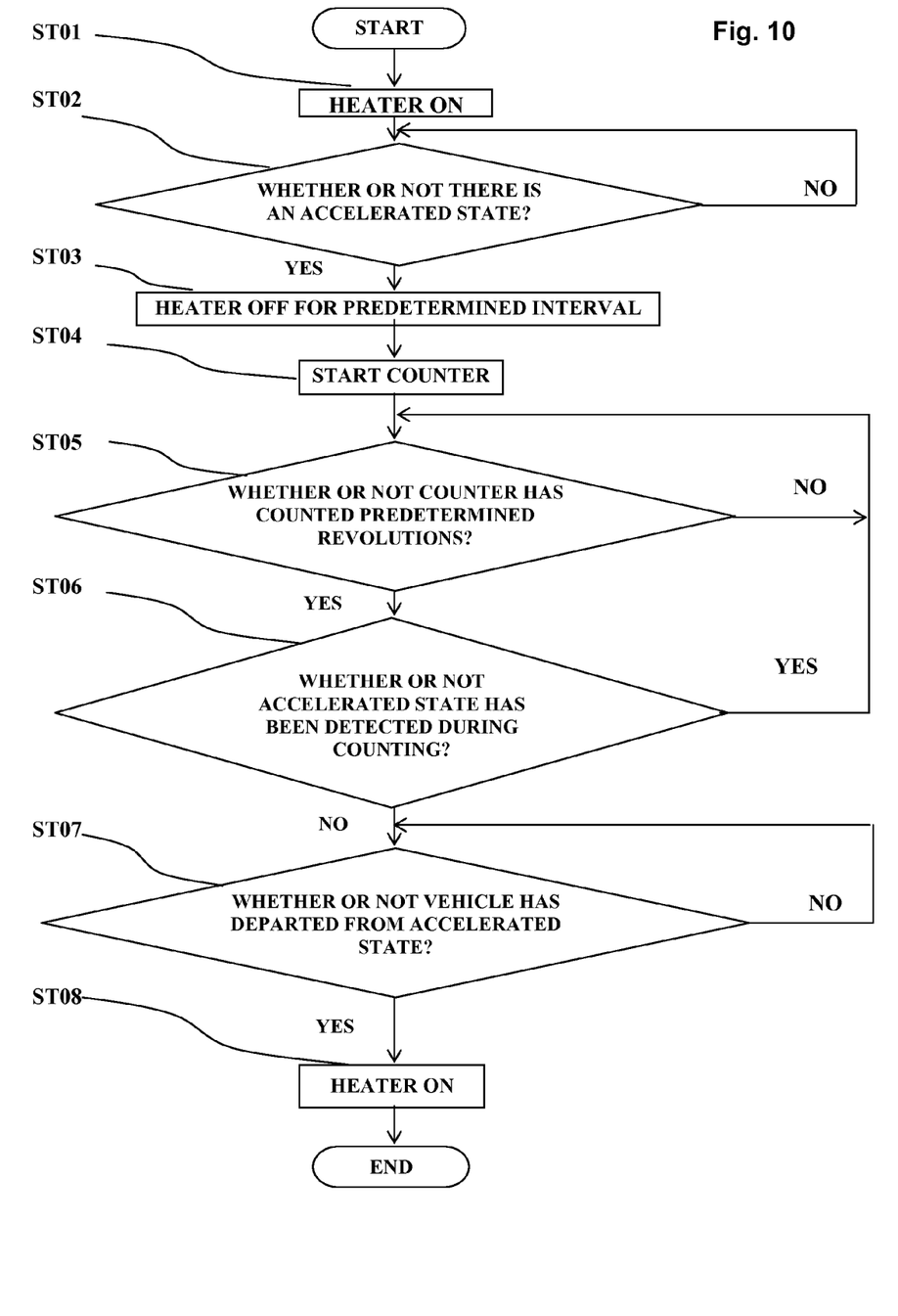
FIG. 10 is a flowchart showing control of a heating element of the heated vehicle seat apparatus according to the illustrative embodiment of the present invention.

FIG. 10 is a flowchart showing control of the heating element of the electric heating apparatus 70 for a vehicle seat 27 according to the present invention. Note that STxx denotes a step number.

ST01: The first heating element 71 and/or the second heating element 72 are set to an ON-state by operating the first and second temperature selectors 73 and 74. That is to say, it is only necessary to set either the first heating element 71 or the second heating element 72 to the ON-state.

ST02: A determination is made as to whether or not the accelerated state is present. If it is determined that there is acceleration, the processing goes to ST03. If there is no acceleration, ST02 is repeated.

Here, concerning the accelerated state, the control unit 85 determines that the accelerated state is present when the throttle angle sensor 94 detects a throttle angle change in the throttle valve 93 exceeding, for example, 0.6 degrees within 20 msec.

In the electric heating apparatus 70, the accelerated state is defined as the state when the throttle angle sensor 94 detects the throttle angle change in the throttle valve 93 for adjusting the revolutions of the engine 24 (see FIG. 1) in an amount exceeding the predetermined angle within the predetermined time period. Accordingly, it is possible to accurately detect the accelerated state in the case of acceleration from a low vehicle speed and in the case of acceleration from a high vehicle speed. In other words, it is possible to grasp the accelerated state irrespective of the vehicle speed by detecting the accelerated state depending on the throttle angle change.

ST03: The first heating element 71 and/or the second heating element 72 are set to an OFF-state for a predetermined interval.

Here, concerning the predetermined interval, the control unit 85 determines a point when the crankshaft revolutions sensor 92 detects, for example, 250 revolutions of the crankshaft 86 as the predetermined interval.

In the electric heating apparatus 70, the predetermined interval is defined as an interval which begins at the time of the blocking of the battery (the electric power source) 81 by the first and second electric power source relays (the electric power source blocking mechanism) to the time of rotation of the crankshaft 86 of the engine 24 (see FIG. 1) for the predetermined revolutions. Accordingly, it is possible to set the predetermined interval longer when the revolutions of the engine 24 are low and to set the predetermined interval shorter when the revolutions of the engine 24 are high. In other words, the interval for blocking the electric power source 81 can be set to reflect a driving condition (the accelerated state) by allowing the predetermined interval to correspond to the revolutions of the engine 24.

ST04: Simultaneously with the determination as the accelerated state in ST02 and turning off the first heating element 71 and/or the second heating element 72 in ST03, the counter 89 of the control unit 85 is started to initiate counting of rotation of the crankshaft 86.

ST05: The rotation of the crankshaft 86 is counted with the counter 89 and a determination is made as to whether or not rotation of the crankshaft 86 achieves the predetermined revolutions. In other words, counting is continued until the crankshaft achieves 250 revolutions. If the crankshaft 86 achieves 250 revolutions, the processing goes to ST06. If crankshaft 86 does not, ST05 is repeated.

ST06: A determination is made as to whether or not there is an accelerated state again while counting the predetermined revolutions. If there is not an accelerated state, the processing goes to ST07. If there is an accelerated state, however, the processing returns to ST05 and rotation of the crankshaft 86 is counted again starting from the beginning, that is, from a count of zero.

In the electric heating apparatus 70, the control unit 85 includes the counter 89 for counting rotation of the crankshaft 86 from the beginning when the accelerated state is detected again in the course of blocking the electric power source (the battery) 81. Accordingly, it is possible to block the electric power source 81 again when acceleration is restarted at a highway entrance, for example. As a result, it is possible to further improve the acceleration performance of the motorcycle 10 (see FIG. 1).

Simultaneously with the determination as the accelerated state in ST02, turning off the first heating element 71 and/or the second heating element 72 in ST03 is detected. The starting the counter 89 of the control unit 85 in ST04 and the starting to count rotation of the crankshaft 86 with the counter 89 in ST05 is also detected and a determination is made as to whether or not the accelerated state is detected in the course of counting. A determination is also made as to whether or not the vehicle has departed from the accelerated state. If the vehicle has departed from the acceleration state, the processing goes to ST08. If the vehicle has not departed from the acceleration state and is still accelerating, ST07 is repeated.

ST08: The first heating element 71 and/or the second heating element 72 are turned on and the seats are warmed up. In other words, the electric supply to the first heating element 71 and/or the second heating element 72 is restarted.

Here, as shown in FIG. 5, in the electric heating apparatus 70 for a vehicle seat 27 according to the present invention, the second temperature selector 74 is provided in the glove compartment 49a beside the rear seat (the passenger seat) 49. However, without limitation to the foregoing, it is also possible to set up the device by burying the temperature selector in the rear seat, for example.

As shown in FIG. 10, the electric heating apparatus 70 for a vehicle seat 27 according to the present invention performs control to block electric supply to the first and second heating elements 71 and 72 upon detection of acceleration. However, without limitation to the foregoing, it is also possible to perform control to block electric supply to the first and second heating elements upon detection of acceleration only in a period from application of the electric power source to passage of the predetermined time period.

As shown in FIG. 1, the electric heating apparatus 70 according to the present invention applies to the motorcycle 10 as the vehicle. However, without limitation to the foregoing, the vehicle may be a saddle-riding vehicle such as a rough (all) terrain vehicle or a jet ski, for example.

As shown in FIG. 7, the heated vehicle seat apparatus according to the present invention is configured to control the two heating elements including the first and second heating elements 71 and 72. However, without limitation to the foregoing, it is possible to control one heating element, or three or more heating elements.

The heated vehicle seat apparatus according to the present invention is suitable for application to a large-sized motorcycle.

While a working example of the present invention has been described above, the present invention is not limited to the working example described above, but various design alterations may be carried out without departing from the spirit and scope of the present invention as set forth in the claims.

Having thus described the invention, what is claimed is:

1. A vehicle, comprising:
   a frame;
   an engine which is a source of power for driving the vehicle, the engine being operatively attached to the frame
   an alternating-current generator operatively attached to the frame,
   a vehicle seat,
   a heating element operatively associated with the vehicle seat,
   an electric power source for supplying power to the heating element, and
   a control unit which is operable to control the heating element to warm the vehicle seat,
   wherein the control unit includes an electric power-interrupting device for temporarily blocking electric power supply to the heating element for a predetermined interval under an accelerated state of operation.

2. A vehicle according to claim 1, wherein
   the vehicle seat comprises a seat cushion and an outer seat cover overlying the seat cushion; and wherein the vehicle further includes
   an electric heating apparatus, comprising:
   the heating element operatively associated with the seat cushion and disposed below the outer seat cover, said heating element being operable to generate heat when connected to an electric power supply; and
   the control unit operatively connected to the heating element;
   wherein said control unit is operable to supply an electric current to the heating element in an amount larger than a normal operating level for a predetermined warm-up period after initiation, and to restore the electric current to the normal operating level after passage of the predetermined warm-up period.

3. The heated vehicle seat apparatus according to claim 2, wherein
   the vehicle seat is a two-passenger seat including a front seat for supporting a driver and a rear seat for supporting a passenger;
   wherein the heating apparatus includes first and second heating elements for respectively warming up the front and rear seats, and
   wherein the electric heating apparatus includes first and second temperature selectors capable of respectively and independently setting temperatures of the first and second heating elements.

4. The heated vehicle seat apparatus according to claim 3, wherein the first temperature selector is disposed at an instrument panel in front of the front seat, and the second temperature selector is disposed on a glove compartment beside the rear seat.

5. The heated vehicle seat apparatus according to claim 3, wherein the electric heating apparatus includes
   a first thermostat for sensing a temperature of the front seat and regulating a supply of electric current to the first heating element as required by the control unit, and
   a second thermostat for sensing a temperature of the rear seat and regulating the supply of electric current to the second heating element as required by the control unit.

6. The heated vehicle seat apparatus according to claim 2, wherein the heating element is embedded within the seat cushion.

7. The heated vehicle seat apparatus according to claim 6, wherein the vehicle seat comprises at least one seat base portion and at least one substantially vertical back support portion, and wherein the heating element includes a first section provided in the at least one seat base portion, and a second section attached to the first section and disposed in the corresponding back support portion.

8. The vehicle according to claim 1, wherein the engine comprises
a crankshaft, and
wherein the predetermined interval is equal to a time interval beginning when the electric power supply is blocked by the electric power-interrupting device, and ending when the number of rotations of the crankshaft of the engine equals a predetermined number.

9. The vehicle according to claim 1, wherein the engine comprises a throttle valve for adjusting the engine speed,
wherein the accelerated state is defined to exist when there is a throttle angle change exceeding a predetermined angle within a predetermined time period in the throttle valve.

10. The vehicle according to claim 1, wherein
the control unit includes a counter for counting rotations of the crankshaft, the counter capable of being reset to count from zero when the accelerated state is detected again in the course of blocking the electric power source.

11. The vehicle according to claim 1, wherein,
the control unit includes an electric power source applying device for restarting supply of the electric power to the vehicle seat heating element upon detection of a departure from the accelerated state in the course of blocking the electric power source.

12. A method of heating a vehicle seat in a vehicle, the vehicle comprising:
an engine which is a source of power for driving the vehicle,
an alternating-current generator,
a vehicle seat,
a vehicle seat heating element,
an electric power source which is operable to supply power at a normal operating level to the vehicle seat heating element, and
a control unit which is operable to control the vehicle seat heating element so as to warm up the vehicle seat,
the control unit comprising a power-interrupting device for blocking the supply of electric power to the vehicle seat heating element,
wherein said method comprises the steps of:
a) controlling the power supply using the control unit so as to supply an electric current larger than the normal operating level to the heating element for a first predetermined time period after applying an electric power source, and to restore the electric current to the normal operating level after passage of the first predetermined time period,
b) monitoring the engine speed, and
c) blocking the electric power supply using the power-interrupting device, for a second predetermined time period, upon detection of an accelerated state of the engine.

13. The method of heating a vehicle seat according to claim 12, wherein the engine comprises a crankshaft, and wherein the second predetermined time period is equal to a time interval beginning when the electric power source is blocked by the power-interrupting device, and ending when the number of rotations of the crankshaft equals a predetermined number, wherein the engine comprises a throttle valve for adjusting the engine speed,
and wherein the accelerated state is defined to exist when there is a throttle angle change exceeding a predetermined angle within a third predetermined time period in the throttle valve.

14. The method of heating a vehicle seat according to claim 12, wherein
the control unit includes a counter for counting rotations of the crankshaft, a method step comprising:
resetting the counter to count from zero when the accelerated state is detected while blocking the electric power source.

15. The method of heating a vehicle seat according to claim 12, wherein,
the control unit includes an electric power source applying device for restarting supply of the electric power, and further comprising a step of
restarting the supply of electric power to the vehicle seat heating element upon detection of a departure from the accelerated state while in the course of blocking the electric power source.

* * * * *